L. R. DAVIS.
COOKING APPARATUS.
APPLICATION FILED DEC. 8, 1909.

972,603.

Patented Oct. 11, 1910.
2 SHEETS—SHEET 1.

WITNESSES:

INVENTOR
Lester R. Davis
BY
ATTORNEYS

L. R. DAVIS.
COOKING APPARATUS.
APPLICATION FILED DEC. 8, 1909.
972,603.
Patented Oct. 11, 1910.
2 SHEETS—SHEET 2.
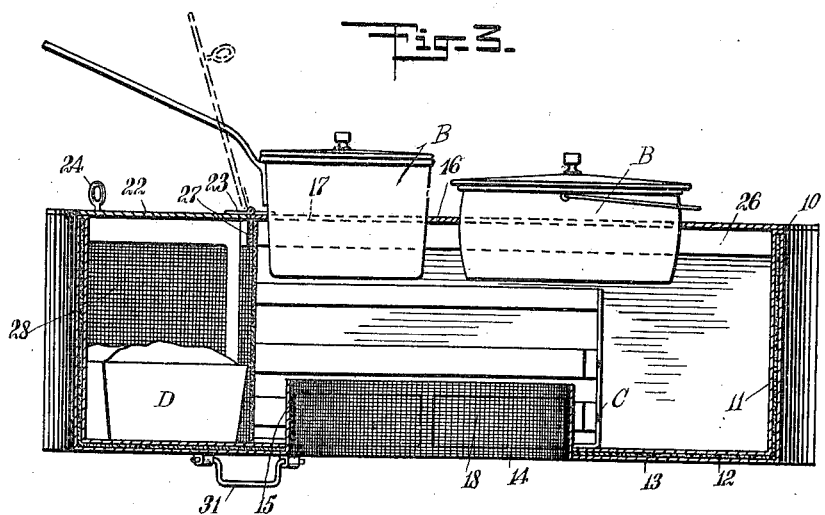
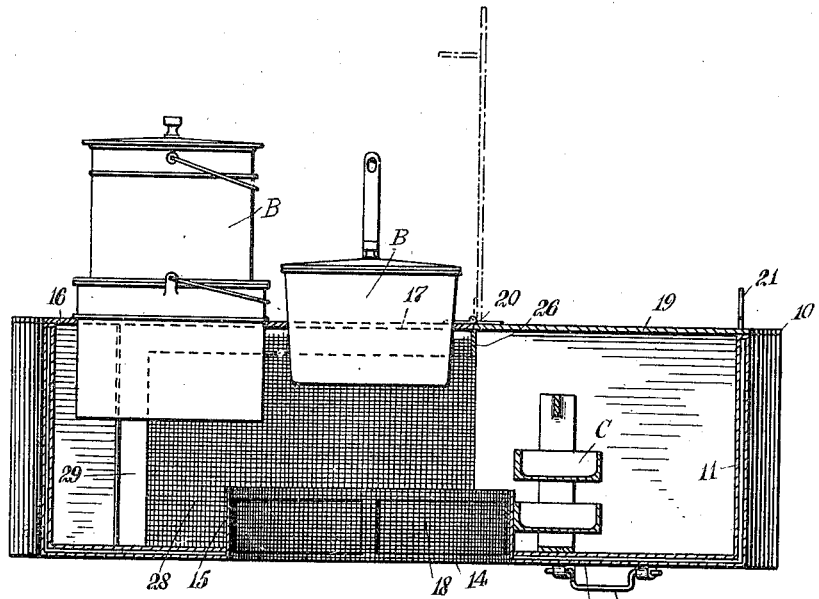
WITNESSES:
INVENTOR
Lester R. Davis
BY
ATTORNEYS
THE NORRIS PETERS CO., WASHINGTON, D. C.

UNITED STATES PATENT OFFICE.

LESTER ROGERS DAVIS, OF RIVERSIDE, CALIFORNIA.

COOKING APPARATUS.

972,603.

Specification of Letters Patent.

Patented Oct. 11, 1910.

Application filed December 8, 1909. Serial No. 532,029.

*To all whom it may concern:*

Be it known that I, LESTER R. DAVIS, a citizen of the United States, and a resident of Riverside, in the county of Riverside and State of California, have invented a new and Improved Cooking Apparatus, of which the following is a full, clear, and exact description.

This invention relates to cooking appara10 tus for use in connection with stoves of various kinds, and relates more particularly to apparatus of this class comprising a casing having an opening adapted to receive a burner of the stove when the casing is posi15 tioned thereon, the casing being provided with a top having hinged sections giving access to the casing, the casing having further, a reticulate partition dividing it into compartments.

An object of the invention is to provide simple, economic and inexpensive cooking apparatus, which can be used in connection with gas, oil or other cook stoves for preparing food and the like, which permits of dif25 ferent kinds of food being prepared simultaneously, which effects a saving in fuel owing to the conservation of the heat used in cooking, with which cooking vessels or utensils of different kinds can be employed, and by means of which food can be thoroughly and hygienically cooked.

A further object of the invention is to provide a cooking apparatus by means of which various cooking utensils can be heated and different articles of food prepared with the use of a single burner of a stove, which is compact in form and light in weight, which can be manipulated without difficulty by inexperienced cooks, and which, if so desired can be used with fireless cookers or similar devices.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1:
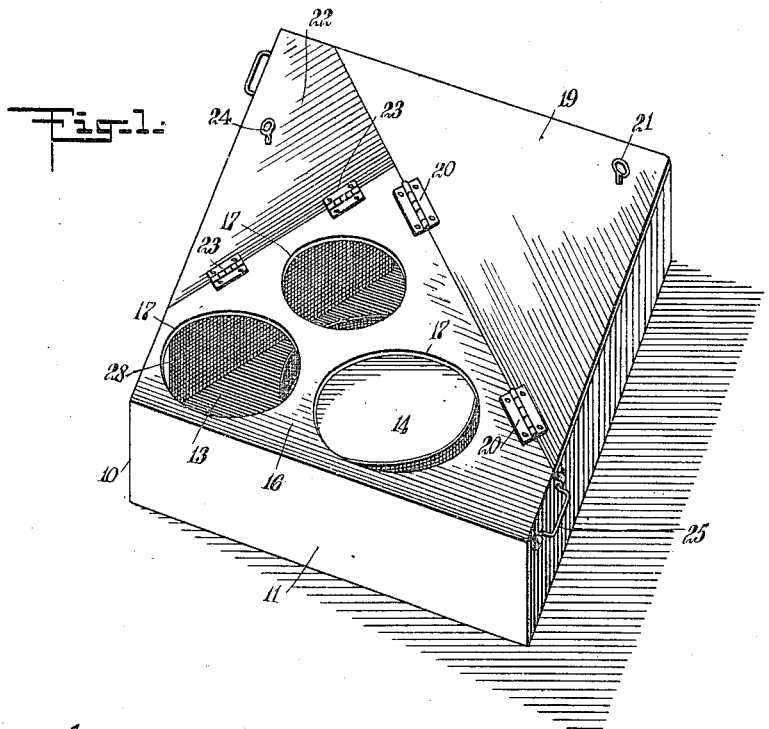
Figure 2:
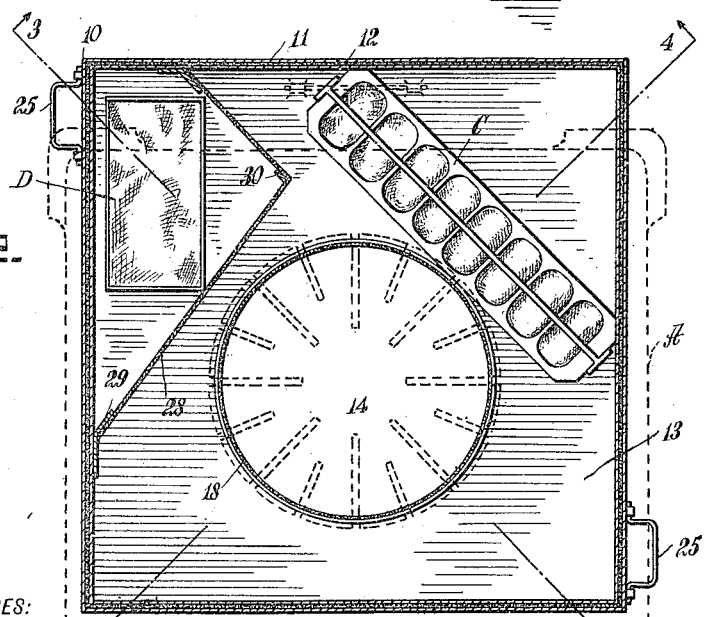

Figure 1 is a perspective view of an embodiment of my invention; Fig. 2 is a horizontal section of the apparatus; Fig. 3 is a transverse section on the line 3—3 of Fig. 2; and Fig. 4 is a similar view on the line 4—4 of Fig. 2.

Before proceeding to a more detailed explanation of my invention, it should be clearly understood that while the device is particularly useful in connection with oil and gas stoves it can also be advantageously employed with other stoves such as coal or wood burners.

The casing has a single opening adapted to receive a burner of the stove, or which can be arranged so that it registers with the opening in the top of an ordinary stove to permit the heat to enter the casing.

I prefer to fashion the device from sheet metal, in two thicknesses, having a layer of insulating material, such as asbestos, between. This constructive detail, as well as others can, however, be varied in accordance with special conditions and individual preference, without departing from the underlying spirit of the invention. While I have shown for example, a cooking apparatus having a casing of rectangular form, I do not wish to limit myself to this shape, as others can be equally well employed.

Referring more particularly to the drawings, I provide a casing 10 having double side walls 11 with a layer of insulating material 12 therebetween. The bottom 13 of the casing has an opening 14 therethrough adapted to receive the burner of a stove A as is indicated in dotted outline in Fig. 2. The opening 14 is preferably circular and has surrounding the same an upwardly extending annular frame 15 which acts as a guard to prevent objects from falling into the burner opening when the apparatus is in use. The bottom 13 of the casing is preferably also double and has an insulating layer between the sheets of metal. The frame 15 carries a reticulate wall or guard 18.

The side walls carry the casing top 16 which has a plurality of openings 17 therethrough of different dimensions and adapted to receive and hold cooking utensils B as is clearly indicated in Figs. 3 and 4. These utensils, needless to say, may be of different kinds and serve different purposes.

The top 16 has a section 19 movably secured thereto along a line diagonal with respect to the casing, by means of hinges 20. The section 19 has a grip 21 by means of which it can be raised and lowered to permit the insertion of a cooking utensil of any suitable kind into the body of the casing. As is shown for example, this utensil may consist of a baking device C. The top has a further section 22 movably secured thereto by means of hinges 23 along a line at an angle with the hinge line of the section 19. The section 22 has a handle 24 for a purpose similar to that of the handle 21. At the sides of the casing are provided grips 25 by means of which the entire casing can be moved bodily.

Underneath the top of the casing and extending diagonally across the same, substantially along the hinge line of the section 19, is a bracing strip or carrier 26 which assists in supporting the top. A similar strip 27 follows the hinge line of the section 22 and connects with the strip 26. A reticulate partition 28 having a frame 29 is located within the casing and follows the inner outline of the section 22, as is shown most clearly in Fig. 2. The partition divides the casing into compartments of different sizes. The smaller compartment under the hinge section 22 of the top can receive a suitable cooking, baking or heating utensil D, and the partition serves to guard against the accidental displacement of the utensil or other article in the compartment. The partition 28 has angularly disposed parts between which is a substantially vertical brace 30 constituting part of the frame 29.

The bottom of the casing, near one edge, has a hanger 31 or like device by means of which the apparatus can be suspended from a hook or nail, in inoperative position, when it is not in use.

Having thus described my invention, I claim as new, and desire to secure by Letters Patent:—

1. Apparatus of the class described, comprising a casing having an opening adapted to receive a burner when the casing is mounted upon a stove, said casing being provided with a top having a hinged section, and a reticulate partition dividing the casing and extending from one wall thereof to an adjacent wall, said opening having an inwardly projecting guard rim.

2. Apparatus of the class described, comprising a casing having an opening adapted to be located above a burner when the casing is mounted upon a stove, said casing being provided with a top having hinged sections, and a reticulate partition within said casing dividing the same into compartments, each having above it one of said sections, said top being provided with a plurality of openings adapted to receive cooking utensils, said first-mentioned opening having an inwardly projecting annular guard rim, the walls of said casing being double and having therebetween a layer of insulating material.

3. Apparatus of the class described, comprising a casing having an opening adapted to receive a burner when the casing is mounted upon a stove, said casing being provided with a top having a hinged section, and a reticulate partition dividing the casing from wall to wall thereof, said opening having an inwardly projecting guard rim, said guard rim comprising a frame, and a reticulate wall carried thereby, said top having a plurality of openings therein adapted to receive cooking utensils, said casing having grips wherewith it can be manipulated.

4. Apparatus of the class described, comprising a casing having an opening adapted to be located above a burner when the casing is mounted upon a stove, said casing being provided with a top having sections hinged thereto along lines at angles with each other, a reticulate partition within said casing and arranged to correspond with the inner outline of one of said sections, said partition including a frame having a bracing member under said top, a further bracing member under said top and extending along the hinge line of said other section of said top, said top having openings adapted to receive utensils, said casing having around said first-mentioned opening an inwardly disposed guard rim.

In testimony whereof I have signed my name to this specification in the presence of two subscribing witnesses.

LESTER ROGERS DAVIS.

Witnesses:
   D. E. FURROW,
   W. D. STILLMAN.